(No Model.) 3 Sheets—Sheet 1.

J. W. POWELL.
AUTOMATIC BRAKE FOR PULLEY BLOCKS.

No. 528,646. Patented Nov. 6, 1894.

WITNESSES
Charles Bronckheley
Herbert Whitehouse.

INVENTOR
John William Powell (No Model.) 3 Sheets—Sheet 2.
J. W. POWELL.
AUTOMATIC BRAKE FOR PULLEY BLOCKS.

No. 528,646. Patented Nov. 6, 1894.

WITNESSES
Charles Bosworth Kelley
Herbert Whitehouse

INVENTOR
John William Powell

UNITED STATES PATENT OFFICE.

JOHN WILLIAM POWELL, OF SMETHWICK, ASSIGNOR TO HOLT & WILLETTS, OF CRADLEY HEATH, ENGLAND.

AUTOMATIC BRAKE FOR PULLEY-BLOCKS.

SPECIFICATION forming part of Letters Patent No. 528,646, dated November 6, 1894.

Application filed April 3, 1894. Serial No. 506,208. (No model.)

*To all whom it may concern:*

Be it known that I, JOHN WILLIAM POWELL, a subject of Her Majesty the Queen of Great Britain and Ireland, residing at Smethwick, in the county of Stafford, England, have invented certain new and useful Improvements in Automatic Brakes for Pulley-Blocks, Hoists, and other Lifting Appliances, of which the following is a specification.

This invention consists of the herein described improved construction and arrangement of the parts of automatic brakes for pulley blocks, hoists, cranes and other lifting appliances.

By my said invention a brake for the purposes set forth is so arranged as to offer no resistance against the turning of the motion shaft to lift the load but when the load is suspended or being lowered, the brake is instantly automatically applied in exact proportion to the lifted weight so that in any particular pulley block or other lifting appliance to which my said invention is applied the power required to lower the weight remains about the same for a light load as for the heaviest load.

I will describe this invention as applied to a pulley block of that kind in which the weight is lifted by a worm and worm wheel which are made of so coarse a pitch that if there were no brake on the worm shaft the load would lower itself reacting through the worm wheel and worm and turning the worm shaft.

Figure 1:
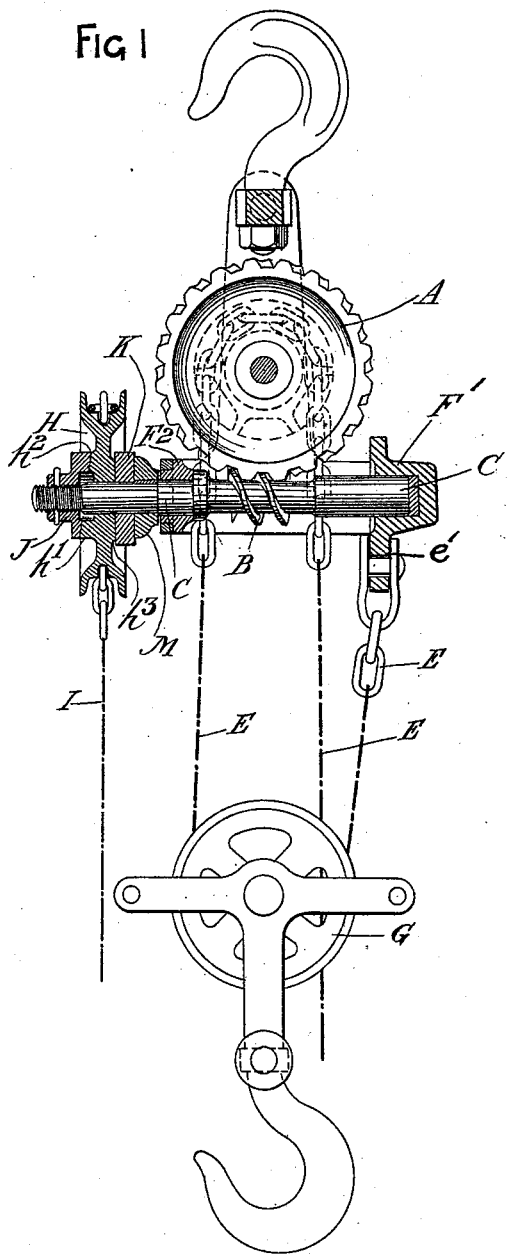
Figure 2:
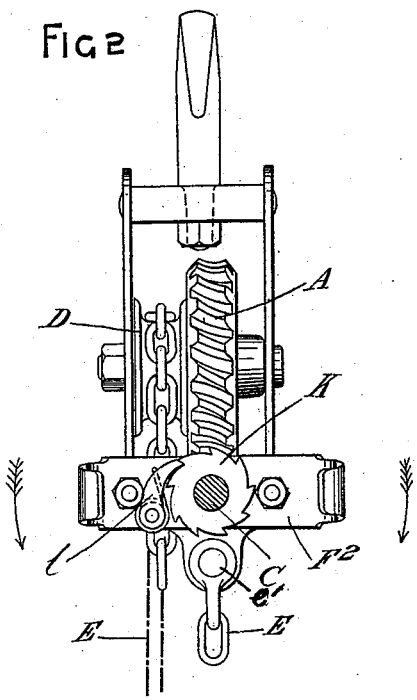
Figure 3:
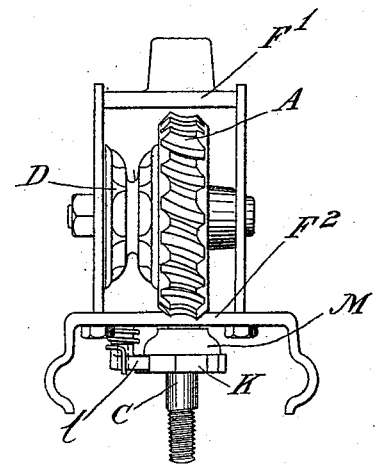
Figure 4:
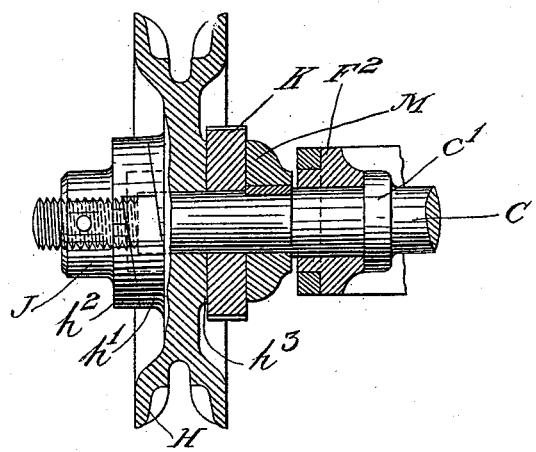
Figure 5:
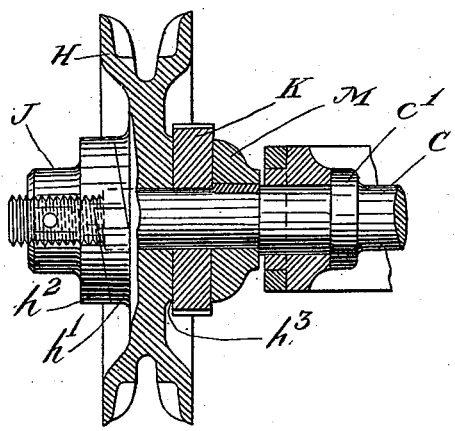
Figure 6:
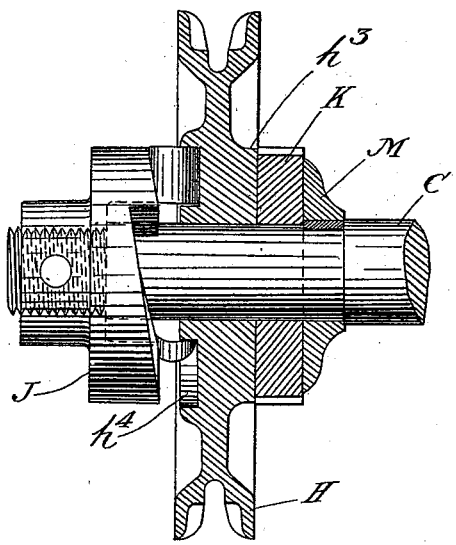
Figure 8:
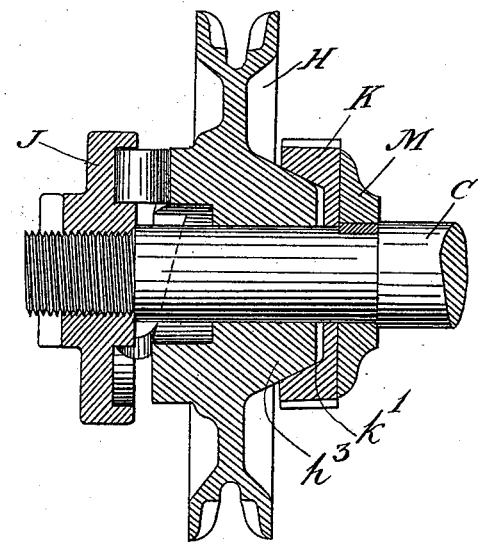
Figure 7:
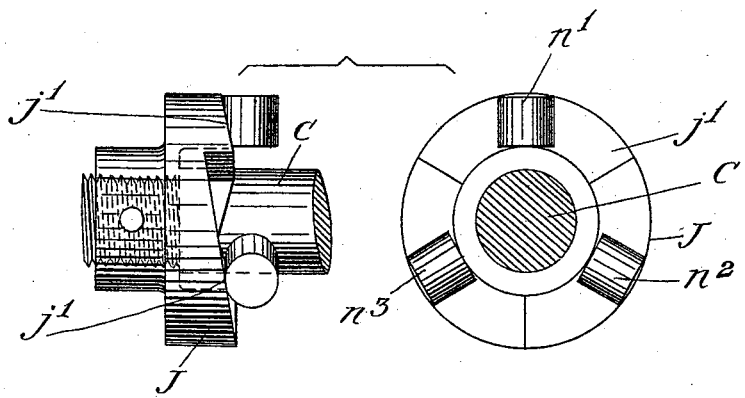

On the accompanying drawings Figure 1 is a sectional side elevation of a worm and worm wheel pulley block with my invention applied. Fig. 2 is an end elevation of the same with the hand chain wheel removed. Fig. 3 is a plan of the same with the hand chain wheel removed. Figs. 4 and 5 are sectional elevations of the hand chain lifting wheel and automatic brake parts of the said pulley block on an enlarged scale. Fig. 6 is a sectional elevation of a modified form of the hand chain lifting wheel and automatic brake parts of the said pulley block. Fig. 7 represents parts of the automatic brake, Fig. 6, separately; and Fig. 8 is a sectional elevation of a further modification of my invention as hereinafter fully described.

The same letters of reference indicate the same or corresponding parts in all the figures of the drawings.

Referring first more particularly to Figs. 1, 2, 3, 4 and 5, A is the worm wheel of the upper block gearing with and arranged to be turned by the worm B formed with the worm shaft C. Formed with the worm wheel A is the toothed chain wheel D.

E is the lifting chain which at one end is fixed at $e'$ to one of the cross bars $F'$ of the upper block and then passes underneath the sheave G of the lower block and up and over the chain wheel D of the upper block, so that as the worm shaft C is turned in one or the other direction the worm wheel A and chain wheel D will be turned and the weight suspended by the lower block will be raised or lowered as is well understood.

The parts above described are of ordinary construction and their action is well known.

In carrying out this invention the hand chain wheel H (over which passes the endless hand chain I for lifting and lowering) is mounted loosely upon the worm shaft C—that is to say the hand chain wheel H can turn through a certain angle independently of the worm shaft C. Formed on one side of the hand chain wheel H there is a boss $h'$ which has a helicoidal inclined plane $h^2$ formed upon it which acts against a corresponding helicoidal inclined plane formed upon the collar J which is fixed to or formed upon the worm shaft C. The boss $h^3$ formed upon the other side of the hand chain wheel H is made flat and turned (or as hereinafter described this boss may be conical or otherwise shaped) and fits against the face of the ratchet wheel K which is made to correspond with the face of the boss $h^3$ and which rides loosely on the worm shaft C. The spring pawl $l$ on the cross bar $F^2$ of the pulley block frame engages with the teeth of the ratchet wheel K (see Figs. 2 and 3) to prevent the ratchet wheel turning with the worm shaft C when the load is being lowered. A collar M rigidly fixed on the worm shaft C keeps the ratchet wheel K in position against the boss $h^3$ of the hand chain wheel H. The worm shaft C is prevented from moving endwise by the collar $c'$ formed thereon bearing against the cross bar F² and by the end of the worm shaft C taking against the closed end of its bearing in the cross bar F'.

The automatic brake above described acts as follows:—When the hand chain wheel H is turned in the direction to lift the load, as indicated by the arrow on the right hand side of Fig. 2, the resistance to the turning of the worm shaft C caused by the load makes the helicoidal inclined plane $h^2$ of the hand chain wheel H to act against the helicoidal inclined plane on the collar J on the worm shaft C, so as to thrust the hand chain wheel H against the face of the ratchet wheel K (see Fig. 4) and the latter against the collar M fixed on the shaft C, so that the hand chain wheel H, ratchet wheel K and worm shaft C all turn together in the same direction, the teeth of the ratchet wheel K passing the pawl $l$ which offers no resistance against the lifting of the load. When the hand lifting chain I is released the lifted load tends to turn the worm shaft C, collar M, ratchet wheel K, and hand chain wheel H, in the opposite direction (shown by the arrow on the left hand side of Fig. 2) but the turning of the ratchet wheel K in this direction is arrested by the pawl $l$ and then the friction between the boss $h^3$ of the hand chain wheel H and face of the ratchet wheel K and fixed collar M as aforesaid is sufficient to maintain the load, so that a very slight pull on the hand lowering chain I, in the direction shown by the arrow on the left hand side of Fig. 2 will turn the hand chain wheel H, collar J and worm shaft C together slightly loosening the face of the hand chain wheel H from the ratchet wheel K (see Fig. 5) and lowering the load.

It will be seen that by means of the helicoidal inclined planes as above described the thrust of the boss $h^3$ of the hand chain wheel H against the face of the ratchet wheel K is in exact proportion to the load being lifted so that the brake will sustain either a heavy load or a light load and will offer about the same resistance to the lowering of a light load as it does to the lowering of a heavy load.

Instead of the frictional surface of the boss $h^3$ of the hand chain wheel H and the corresponding face of the ratchet wheel K being made flat as above described and shown in Figs. 1, 3, 4 and 5 these frictional surfaces may be made conical as shown in Fig. 8 where it will be seen that the boss $h^3$ is made conical and fits in a corresponding recess $k'$ in the face of the ratchet wheel K.

In order to prevent the inclined face or inclined faces of the boss $h'$ sticking to the corresponding faces of the boss J as might be the case in very large pulley blocks, hoists, or other lifting appliances, I may use one or more hardened steel or other hard rollers such as $n'$ $n^2$ $n^3$ shown in Figs. 6 and 7 each of these rollers fitting between an inclined face $j'$ of the boss J and a groove $h^4$ turned in the face of the hand chain wheel H. The collar J with the rollers in position are shown separately by Fig. 7. Instead of having three rollers and corresponding inclines I may employ one, two, or more than three rollers and corresponding inclines as will be well understood. Also instead of the inclined surface or inclined surfaces being formed on the collar J for the rollers to act upon, as shown in Figs. 6 and 7, the said inclined surface or inclined surfaces $j'$ may be formed on the face of the hand chain wheel H as shown in Fig. 8, the boss J in this case being made with a flat grooved face for the said rollers to act against.

My invention above described is similarly applied to other lifting appliances whether the power be obtained by worm and worm wheel gearing or by spur gearing or other means.

Having now described my invention, what I claim as new, and desire to secure by Letters Patent, is—

1. In combination in a hoisting apparatus, the worm shaft C, the hand chain wheel H loose thereon, and having an inclined outer face, the ratchet wheel loose on the shaft C and on the inner side of the chain wheel, the collar M on the inner side of the ratchet wheel against which it bears, and the means for holding the hand chain wheel H in place and for forcing the same against the ratchet consisting of the collar J secured on the end of the shaft C opposite the ratchet, said collar having inclines corresponding to those of the chain wheel, substantially as described.

2. In combination in a hoisting apparatus, the worm shaft C, the hand chain wheel loose thereon and having an incline on its outer face, the ratchet and pawl, the collar M, the collar J secured on the worm shaft and having the incline corresponding to that on the chain wheel and the rollers interposed between the inclined faces, substantially as described.

In witness whereof I have hereunto set my hand in presence of two witnesses.

JOHN WILLIAM POWELL.

Witnesses:
CHARLES BOSWORTH KETLEY,
HERBERT WHITEHOUSE.